United States Patent Office 3,021,343
Patented Feb. 13, 1962

3,021,343
HYDROGENATION PROCESS
Donald G. Manly, Barrington, Ill., assignor to The Quaker Oats Company, Chicago, Ill., a corporation of New Jersey
No Drawing. Filed July 7, 1958, Ser. No. 746,648
10 Claims. (Cl. 260—345.1)

This invention relates to a hydrogenation process and more particularly to a process for hydrogenating oxyheterocyclic compounds which are subject to hydrogenolysis when the catalyst employed is a highly-active reduced-nickel catalyst.

A number of processes have been suggested in the prior art for hydrogenating oxyheterocyclic compounds such as furan, methylfuran, and dihydropyran. These processes generally employ catalysts of relatively low activity and as a result produce the desired hydrogenated product in less than satisfactory yield, purity and/or conversion. If a highly active catalyst such as a reduced nickel catalyst is employed the furan, methylfuran or dihydropyran starting materials are subject to hydrogenolysis because of their inherent nature. As a result uncontrollable hot zones occur in the hydrogenation reactor with resulting low yields and plugging of the catalyst due to carbon deposits. Such prior art processes may also be liquid phase or may require relatively high temperatures of reaction. Where the process is liquid phase relatively high pressures are required with the resulting need for comparatively costly high-pressure equipment. Where such prior art processes require relatively high temperatures there is a correspondingly high requirement of heat energy and accordingly the exit product vapors require a greater amount of cooling.

It is an object of this invention to provide a commercially economical process for producing tetrahydrofuran, methyltetrahydrofuran or tetrahydropyran in substantially quantitative yields of substantially pure product.

Another object of the invention is to provide a vapor-phase process for hydrogenating furan, methylfuran, or dihydropyran at relatively low temperatures and with substantially quantitative conversions.

A further object of the invention is to provide a process for hydrogenating furan, methylfuran or dihydropyran employing a highly-active reduced-nickel catalyst which process obtains long catalyst life.

In accordance with the invention these objects are accomplished by a process in which furan, methylfuran or dihydropyran are contacted in the vapor phase in the presence of a reduced nickel catalyst and a selective poison for the catalyst with a hydrogen-containing gas at a hydrogenating temperature of below about 120° C. The poison employed is furfuryl alcohol or tetrahydrofurfuryl alcohol, preferably in an amount of at least 0.1% by weight based on the weight of the compound being hydrogenated. The upper limit on the amount of poison used is dependent only on economic considerations since any excessive amount in the product can be removed by distillation as tetrahydrofurfuryl alcohol.

Where the compound to be hydrogenated is furan the preferred hydrogenating temperature is in the range from about 70° C. to about 80° C. In hydrogenating methylfuran the preferred temperature range is from about 60° C. to about 65° C. Dihydropyran is preferably hydrogenated at a temperature of about 70° C.

The catalyst employed in the process of this invention may be any highly-active reduced-nickel catalyst such as a nickel catalyst, preferably nickel hydrate, which has been reduced at a temperature below about 450° C., reoxidized by passing a gas containing free oxygen over the reduced catalyst, and again reduced by passing a gas thereover containing free hydrogen at a temperature below about 250° C.

Subsequent to reducing the nickel catalyst at a temperature below about 450° C., as described above, the nickel catalyst material is preferably partially reoxidized by passing a gas containing free oxygen thereover until the ratio of reduced nickel to total nickel is about 55%. The final reduction of the nickel material is then preferably obtained by passing a gas thereover initially containing 5% hydrogen and 95% nitrogen, the hydrogen content having been progressively increased to 100% so that the temperature of the latter reduction step is maintained below about 250° C.

The reduced nickel catalyst may be used as such or it may be supported on any suitable support such as kieselguhr, alumina, pumice, Alundum, charcoal or the various natural or synthetic clay-like supports that are well known to the art. In addition, the catalyst composition may be modified if desired to incorporate certain basic substances such as sodium silicate, calcium oxide, magnesium oxide or the like.

In order to obtain high yields the temperature should be maintained below about 120° C. and preferably below about 100° C. The lower temperature limit is not fixed since it may be at any temperature at which the hydrogenation reaction will occur. For example, temperatures as low as 40° C. have been employed in order to effect complete hydrogenation. Generally speaking, any temperature at which the hydrogenation reaction will occur below about 120° C. and preferably below about 100° C. will be satisfactory. It has been found that at temperatures above about 100° C., and particularly above 120° C., hydrogenolysis begins to occur resulting in the rupture of one or more of the several C—O linkages leading to the formation of undesired hydrogenolysis products such as 2-pentanol and 2-pentanone.

The reaction is carried out in the vapor phase preferably in the presence of a stoichiometric excess of gaseous hydrogen which may or may not be diluted with an inert gas such as nitrogen. The pressure that is employed is not substantially in excess of atmospheric pressure and ordinarily the pressures that are used in the process are only those that are incident to moving the vaporous reactants through the catalyst bed. Thus, by the term "not substantially in excess of atmospheric" pressure is meant to include those higher pressures which may in certain cases be as high as two or three atmospheres it being recognized that the process of this invention is essentially a low pressure operation and that moderate higher pressures could be employed incident to moving the reaction products through the reaction column without departing from the spirit and scope of this invention.

In one embodiment of the invention, a mixture is prepared of the compound to be hydrogenated and the poison for the catalyst. The gaseous mixture is then contacted with the hydrogenating gas under the conditions specified above. In an alternative embodiment, the compound to be hydrogenated in the vapor phase is contacted with a hydrogenating gas containing the catalyst poison in the vapor phase. In still another embodiment of the invention, the hydrogenating gas, the compound to be hydrogenated in the vapor phase, and the catalyst poison in the vapor phase are separately introduced to the reaction column.

The invention will be further illustrated but is not limited by the following examples in which analyses of the final products were in each case determined by vapor phase chromatography:

*Example 1*

A reduced and stabilized catalyst was prepared by the following procedure. Unreduced nickel-kieselguhr tablets were loaded into a vertical reactor. The system was purged with nitrogen and brought to about 260° C. Hydrogen flow was started and the temperature gradually increased to about 427° C. This temperature was maintained by circulating the hydrogen through an external heater. It was necessary to dry the circulating gases by passing them through an external dryer. When the formation of water had virtually stopped the system was cooled to about 32° C. maintaining hydrogen flow. When the system had reached this temperature it was purged with nitrogen. The reduced catalyst was partially reoxidized by adding a small quantity of oxygen with the inert gas. The temperature was maintained below about 57° C. by adjusting the amount of oxygen present. The peak temperature was measured and when that temperature reached the bottom of the reactor the stabilization was complete. After stabilization the system was flushed with air to atmospheric conditions. In this form the catalyst contained about 60% nickel with a ratio of reduced nickel to total nickel of about 55%.

The reduced and stabilized catalyst was charged into a column heated by means of a circulating oil. The catalyst was reduced by passing pure hydrogen down through the column starting at about 140° C. Over a period of four hours the temperature was gradually raised to about 200° C. and held until no further water was given off. After reduction of the catalyst the temperature was lowered to less than 120° C. Methylfuran containing about 0.1% furfuryl alcohol by weight was then vaporized into a stream of pre-heated hydrogen by introducing the methylfuran (containing furfuryl alcohol) into a mass of glass wool through which the pre-heated hydrogen was passed. The resulting mixture was then passed through the catalyst column as a vapor. The operating pressure was about one to two pounds per square inch gauge which was just enough to cycle the vapor through the system. The vapor stream emerging from the catalyst column was passed through a condenser into a chilled container to condense the reaction products.

The foregoing process was carried out under conditions wherein the methylfuran containing furfuryl alcohol was fed at a rate of about 0.08 gram feed per gram catalyst per hour, the hydrogen flow was about 350 liters per mole feed per hour, and the temperature of the reaction column was maintained at about 53° C. The conversion of the methylfuran was almost 100%. The product analyzed 95.6% by weight methyltetrahydrofuran.

*Example 2*

The process of Example 1 was repeated with the exception that the temperature of the reaction column during the hydrogenation of methylfuran was maintained at about 46° C. The conversion of methylfuran was almost 100%. The product analyzed 96.8% by weight methyltetrahydrofuran.

*Example 3*

The process of Example 1 was repeated with the exception that the hydrogen flow was maintained at about 909 liters per mole of feed per hour and the temperature of the reaction column during the hydrogenation of methylfuran was maintained at about 65° C. The conversion of methylfuran was almost 100%. The product analyzed 98.2% by weight methyltetrahydrofuran.

*Example 4*

The process of Example 1 was repeated with the exception that about 0.1% by weight of tetrahydrofurfuryl alcohol was contained in the methylfuran feed instead of furfuryl alcohol and the temperature of the reaction column during the hydrogenation of methylfuran was maintained at about 55° C. The conversion of methylfuran was almost 100%. The product analyzed 95.7% by weight of methyltetrahydrofuran.

*Example 5*

The process of Example 1 was repeated with the exception that the amount of furfuryl alcohol contained in the methylfuran feed was about 0.5% by weight, the feed rate was about 0.09 gram methylfuran per gram catalyst per hour, and the unreacted hydrogen was recycled through the system after preheating at a rate of about 1220 liters of hydrogen-containing gas per mole of methylfuran feed per hour. The conversion of methylfuran was almost 100%. The product analyzed 96.3% by weight of methyltetrahydrofuran.

*Example 6*

A series of runs were made employing the process of Example 1 with the exception that the furfuryl alcohol was omitted from the methylfuran feed. In each case a catalyst plug occurred or an unidentified low-boiling compound was formed. In a run at a reaction temperature of about 70° C. an undesirable initial rise to 120° C. was noted due the formation of a hot zone and about two hours later the catalyst became plugged. At a reactor temperature of about 60° C. an initial rise to about 80° C. was observed. The product in this latter case analyzed 6.6% by weight unidentified material and 87.3% by weight methyltetrahydrofuran. These runs were typical of more than 20 attempts. In all cases the catalyst plug was due to the formation of carbonaceous material at the top of the catalyst bed and caused termination of the operation.

*Example 7*

Example 1 was repeated with the exception that the feed material was furan containing about 0.2% by weight furfuryl alcohol (rather than methylfuran containing 0.1% furfuryl alcohol) and the column temperature was about 85° C. The conversion of furan was about 99.5%. The product analyzed 99.0% by weight of tetrahydrofuran.

*Example 8*

The procedure of Example 7 was repeated with the exception that the furfuryl alcohol was omitted from the furan feed. A carbon deposit built up rapidly on the top of the catalyst bed resulting in a plug and consequent discontinuance of the operation.

*Example 9*

The process of Example 1 was repeated with the exception that the material fed was dihydropyran containing about 0.2% furfuryl alcohol by weight (instead of methylfuran containing furfuryl alcohol) and the reactor column temperature was about 75° C. The recovery of products was about 99% of that fed. The product analyzed 100% by weight of tetrahydropyran.

*Example 10*

The procedure of Example 9 was repeated with the exception that the reactor column temperature was about 86° C. The recovery of products was about 95% of that fed. The product analyzed 100% by weight of tetrahydropyran.

*Example 11*

The procedure of Example 9 was repeated with the exception that the furfuryl alcohol was omitted. The product collected analyzed 95% by weight of tetrahydropyran. However, 38% by weight of the product was lost as a gaseous discharge (a gaseous product which was not tetrahydropyran).

*Example 12*

The process of Example 5 was repeated with the exception that the amount of furfuryl alcohol contained in the methylfuran feed was about 87% by weight, the feed rate was about 0.16 gram feed mixture per gram catalyst per hour, and the unreacted hydrogen was recycled through the system after pre-heating at a rate of about 1010 liters of hydrogen-containing gas per mole of feed mixture per hour, and the column temperature was about 94° C. After distillation at a pot temperature of 100° C. to separate the product from tetrahydrofurfuryl alcohol, a product was obtained which analyzed 95% by weight methyltetrahydrofuran.

Examples 1 to 5, 7, 9 and 10 show that furan, methylfuran or dihydropyran may be hydrogenated in the presence of a highly-active reduced-nickel catalyst with substantially quantitative conversions in substantially quantitative yields of substantially pure product in a vapor phase process at relatively low temperatures. Furthermore, the process can be carried on indefinitely without plugging of the catalyst.

Example 12 shows that the amount of poison employed, in this case furfuryl alcohol, has no critical upper limit. Where a very large amount of furfuryl alcohol poison is employed (87% by weight in this case) the furfuryl alcohol hydrogenated to tetrahydrofurfuryl alcohol may be easily separated from the product by distillation.

Examples 6, 8 and 11 show that where the catalyst poison is omitted hydrogenolysis occurs resulting in plugging of the catalyst or the production of an excessive amount of gaseous hydrogenolysis products.

It is also contemplated that a mixture of furfuryl alcohol and tetrahydrofurfuryl alcohol may be employed as the catalyst poison. Such mixtures are also preferably used in an amount of at least 0.1% by weight based on the weight of the compound being hydrogenated. Such mixtures are regarded as equivalents of either furfuryl alcohol or tetrahydrofurfuryl alcohol used singly.

I claim:

1. In a process of hydrogenating a compound of the group consisting of furan, methylfuran and dihydropyran which comprises contacting said compound in the vapor phase in the presence of a nickel catalyst with hydrogen at a hydrogenating temperature of below about 120° C.; the improvement wherein said catalyst is a nickel catalyst which has been reduced at a temperature below about 450° C., reoxidized by passing a gas containing free oxygen over the reduced catalyst, and again reduced by passing a gas thereover containing free hydrogen at a temperature below about 250° C., and wherein said contacting is in the presence of a catalyst poison of the group consisting furfuryl alcohol and tetrahydrofurfuryl alcohol, said catalyst poison being present in an amount corresponding to at least 0.1% by weight of the compound being hydrogenated.

2. The process of claim 1 wherein the catalyst of said improvement is a nickel catalyst which has been reduced at a temperature below about 450° C., partially reoxidized by passing a gas containing free oxygen thereover until the ratio of reduced nickel to total nickel is about 55%, and again reduced by passing a gas thereover containing free hydrogen at a temperature below about 250° C.

3. The process of claim 1 wherein the catalyst of said improvement is a nickel catalyst which has been reduced at a temperature below about 450° C., partially reoxidized by passing a gas containing free oxygen thereover until the ratio of reduced nickel to total nickel is about 55%, and again reduced by passing a gas thereover initially containing 5% hydrogen and 95% nitrogen, said 5% hydrogen being progressively increased to 100%, whereby the temperature of the latter reduction step is maintained below about 250° C.

4. A process of hydrogenating a compound of the group consisting of furan, methylfuran and dihydropyran which comprises contacting in the vapor phase in the presence of a catalyst a mixture of said compound and a poison for said catalyst, with hydrogen at a hydrogenating temperature of below about 100° C., said poison being of the group consisting of furfuryl alcohol and tetrahydrofurfuryl alcohol, said catalyst poison being present in an amount corresponding to at least 0.1% by weight of the compound being hydrogenated and said catalyst being a nickel catalyst which has been reduced at a temperature below about 450° C., reoxidized by passing a gas containing free oxygen over the reduced catalyst, and again reduced by passing a gas thereover containing free hydrogen at a temperature below about 250° C.

5. The process of claim 4 in which the hydrogenating temperature is in the range from about 40° C. to about 100° C.

6. The process of claim 4 in which said compound is furan and the hydrogenating temperature is in the range from about 70° C. to about 80° C.

7. The process of claim 4 in which said compound is methylfuran and the hydrogenating temperature is in the range from about 60° C. to about 65° C.

8. The process of claim 4 in which said compound is dihydropyran and the hydrogenating temperature is about 70° C.

9. The process of claim 4 in which said mixture is a gaseous mixture of said compound containing at least 0.1% by weight of furfuryl alcohol.

10. The process of claim 4 in which said mixture is a gaseous mixture of said compound containing at least 0.1% by weight of tetrahydrofurfuryl alcohol.

References Cited in the file of this patent

FOREIGN PATENTS 565,175     Great Britain _____ Oct. 3, 1944

OTHER REFERENCES

Adkins: "Reactions of Hydrogen," p. 62, Univ. of Wis. Press (1937).